(12) United States Patent
Goebel et al.

(10) Patent No.: US 8,431,278 B2
(45) Date of Patent: Apr. 30, 2013

(54) PASSIVE WATER DRAIN

(75) Inventors: Steven G. Goebel, Victor, NY (US);
William H. Pettit, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 452 days.

(21) Appl. No.: 12/701,864

(22) Filed: Feb. 8, 2010

(65) Prior Publication Data

US 2011/0195344 A1 Aug. 11, 2011

(51) Int. Cl.
*H01M 8/04* (2006.01)
*F16T 1/34* (2006.01)

(52) U.S. Cl.
USPC ........... 429/414; 429/415; 429/450; 137/177; 137/179

(58) Field of Classification Search .................. 429/414; 137/177, 179
See application file for complete search history.

(56) References Cited

U.S. PATENT DOCUMENTS

| | | | |
|---|---|---|---|
| 6,579,637 B1 * | 6/2003 | Savage et al. | 429/414 |
| 7,455,920 B2 * | 11/2008 | Sakai | 429/414 |
| 8,043,755 B2 * | 10/2011 | Limbeck | 429/433 |
| 2003/0211374 A1 * | 11/2003 | Dehne | 429/26 |
| 2008/0160363 A1 * | 7/2008 | Tsukada | 429/19 |
| 2010/0227230 A1 * | 9/2010 | Goebel et al. | 429/414 |

FOREIGN PATENT DOCUMENTS

DE 102010009004 A1 12/2012

* cited by examiner

*Primary Examiner* — John S Maples
(74) *Attorney, Agent, or Firm* — Fraser Clemens Martin & Miller LLC; J. Douglas Miller (57) ABSTRACT

A passive water drain for removal of water from a fuel cell system is disclosed, the drain including a main body having a cavity formed therein, an interior element, and a hydrophilic porous media. The passive water drain is adapted to simplify the anode reactant recycler, eliminate the need for bypass valve systems used to remove water from the cathode exhaust, and eliminate the need for condensate draining systems used for compressed air entering the cathode.

19 Claims, 3 Drawing Sheets

PASSIVE WATER DRAIN

FIELD OF THE INVENTION

The present invention relates to a fuel cell system and, more particularly, to an apparatus for passive removal of water from the fuel cell system.

BACKGROUND OF THE INVENTION

A fuel cell has been proposed as a clean, efficient, and environmentally responsible energy source for electric vehicles and various other applications. In particular, the fuel cell has been identified as a potential alternative for the traditional internal-combustion engine used in modern vehicles. One type of fuel cell is known as a proton exchange membrane (PEM) fuel cell. Individual fuel cells can be stacked together in series to form a fuel cell stack. The fuel cell stack is capable of supplying a quantity of electricity sufficient to provide power to a vehicle.

Hydrogen is a very attractive fuel because it is clean and can be used to efficiently produce electricity in the fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The electrons from the anode cannot pass through the electrolyte, and thus, are directed through a load to perform work before being sent to the cathode. The protons react with the oxygen and the electrons in the cathode to generate water. Not all of the hydrogen is consumed by the stack, and some of the hydrogen is output as an anode exhaust gas that may include water and nitrogen.

Proton exchange membrane fuel cells (PEMFC) are a popular fuel cell for vehicles. The PEMFC generally includes a solid polymer-electrolyte proton-conducting membrane, such as a perfluorosulfonic acid membrane, for example. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture, and the membrane define a membrane electrode assembly (MEA).

Several individual fuel cells are typically combined in a fuel cell stack to generate the desired power. For the automotive fuel cell stack mentioned above, the stack may include two hundred or more fuel cells. The fuel cell stack typically includes fuel cell subsystems and related devices that aid in the preconditioning and operation of the fuel cell stack. As nonlimiting examples, the fuel cell subsystems and related devices housed within the main body can include end plates, fluid passages, e.g. hydrogen fuel and oxidant (O2/air) passages, coolant pumps, recirculation pumps, drainage valves, fans, compressors, valves, electrical connections, reformers, humidifiers, water vapor transfer units, heat exchangers, and related instrumentation.

Liquid water present in the fuel cell stack and the fuel cell subsystems may prevent optimal operation of the fuel cell stack. Liquid water may block gas flow within the fuel cell stack and the fuel cell subsystems and may freeze when the fuel cell stack is not operating. A portion of the anode exhaust gas may be recycled to maintain an anode stoichiometry without the use of excess hydrogen. When cold hydrogen is injected into a desired anode reactant recycler in fluid communication with the anode, water vapor present in the exhaust gas condenses and is separated from the exhaust. Ice may prevent the operation of a combined bleed and drain valve used to remove the water and excess nitrogen from the fuel cell stack, increasing a startup time of the fuel cell stack. The combined bleed and drain valve minimizes complexity and is typically located adjacent a water collecting portion of the fuel cell subsystem the combined bleed and drain valve is incorporated in. Alternately, separate valves (a bleed valve and a drain valve) may be used to perform bleed and drain functions in the fuel cell subsystem.

Excess nitrogen may be present in the anode of the fuel cell stack and the fuel cell subsystems as a result of extended periods of non-operation of the fuel cell stack, or as a result of bleed through from the cathode. Nitrogen present within the fuel cell stack results in a poor performance of the fuel cell stack. Accordingly, the excess nitrogen must be bled from the system. The bleed valve may also be used to remove the excess nitrogen. Ice may prevent the operation of the bleed valve used to remove the nitrogen from the fuel cell stack, preventing optimal operation of the fuel cell stack.

The cathode exhaust gas may be used to humidify oxygen or air entering the cathode using a water vapor transfer unit (WVT). Liquid water present in the cathode exhaust gas indicates the cathode is over humidified. When the WVT is exposed to liquid water, water in excess of the desired amount may be reintroduced into the cathode. To purge water from the cathode, a bypass valve may be used to direct the cathode exhaust gas away from the WVT. A bypass valve system is typically bulky and generally includes an actuator and a sensor.

Atmospheric air may be compressed and cooled before entering the WVT and cathode. Humidified air leaving the WVT during a cold start may condense and accumulate prior to entering the cathode. It is desirable to remove the condensate prior to the air entering the cathode. Removal of the condensate minimizes the startup time of the fuel cell stack in cold weather. The condensate is typically drained using an intermittently operated draining system. The draining system may take up considerable space and include a collection point, a drain valve, and a condensate level sensor.

It would be desirable to produce a passive water drain for a fuel cell stack that minimizes a complexity of an anode reactant recycler, eliminates the need for bypass valve systems used to remove water from the cathode exhaust, and eliminates the need for condensate draining systems used for compressed air entering the cathode.

SUMMARY OF THE INVENTION

Presently provided by the invention, a passive water drain for a fuel cell stack that simplifies the anode reactant recycler, eliminates the need for bypass valve systems used to remove water from the cathode exhaust, and eliminates the need for condensate draining systems used for compressed air entering the cathode, has surprisingly been discovered.

In one embodiment, a device for receiving a fluid stream comprises a main body having a cavity formed therein, the main body including an inlet, an outlet, and a drain, the inlet adapted to receive the fluid stream, an interior element disposed in the cavity of the main body adapted to increase a tortuosity of the fluid stream, and a hydrophilic porous media disposed adjacent the drain in fluid communication with the cavity, the hydrophilic porous media militating against transfer of the fluid stream through the drain, wherein the fluid stream is exhausted from the cavity through the outlet.

In another embodiment, the device for receiving a fluid stream in a fuel cell system comprises a main body having a cavity formed therein, the main body including an inlet, an outlet, and a drain, the inlet adapted to receive the fluid stream, an interior element disposed in the cavity of the main body adapted to increase a tortuosity of the fluid stream, a hydrophilic porous media sealingly disposed in the drain in fluid communication with the cavity, and a liquid retention feature disposed adjacent the hydrophilic porous media, wherein the hydrophilic porous media militates against transfer of the fluid stream through the drain and the fluid stream is exhausted from the cavity through the outlet.

The invention also provides methods for separating a liquid from a fluid stream.

In one embodiment, the method comprises steps of providing a device having a main body with a cavity formed therein and including an inlet, an outlet, and a drain, providing an interior element disposed in the cavity, providing a hydrophilic porous media in fluid communication with the cavity, one of a thickness and an area of the hydrophilic porous media selected to militate against transfer of the fluid stream through the drain, providing the fluid stream including a liquid from a source of fluid to the inlet, increasing a tortuosity of the fluid stream with the interior element, thereby causing the liquid to collect in the cavity, hydrating the hydrophilic porous media with the liquid collected in the cavity, thereby militating against transfer of the fluid stream through the drain, draining the liquid in excess of a saturation point of the hydrophilic porous media through the drain, and exhausting the fluid stream from the cavity through the outlet.

BRIEF DESCRIPTION OF THE DRAWINGS

The above, as well as other advantages of the present invention, will become readily apparent to those skilled in the art from the following detailed description, when considered in the light of the accompanying drawings in which.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
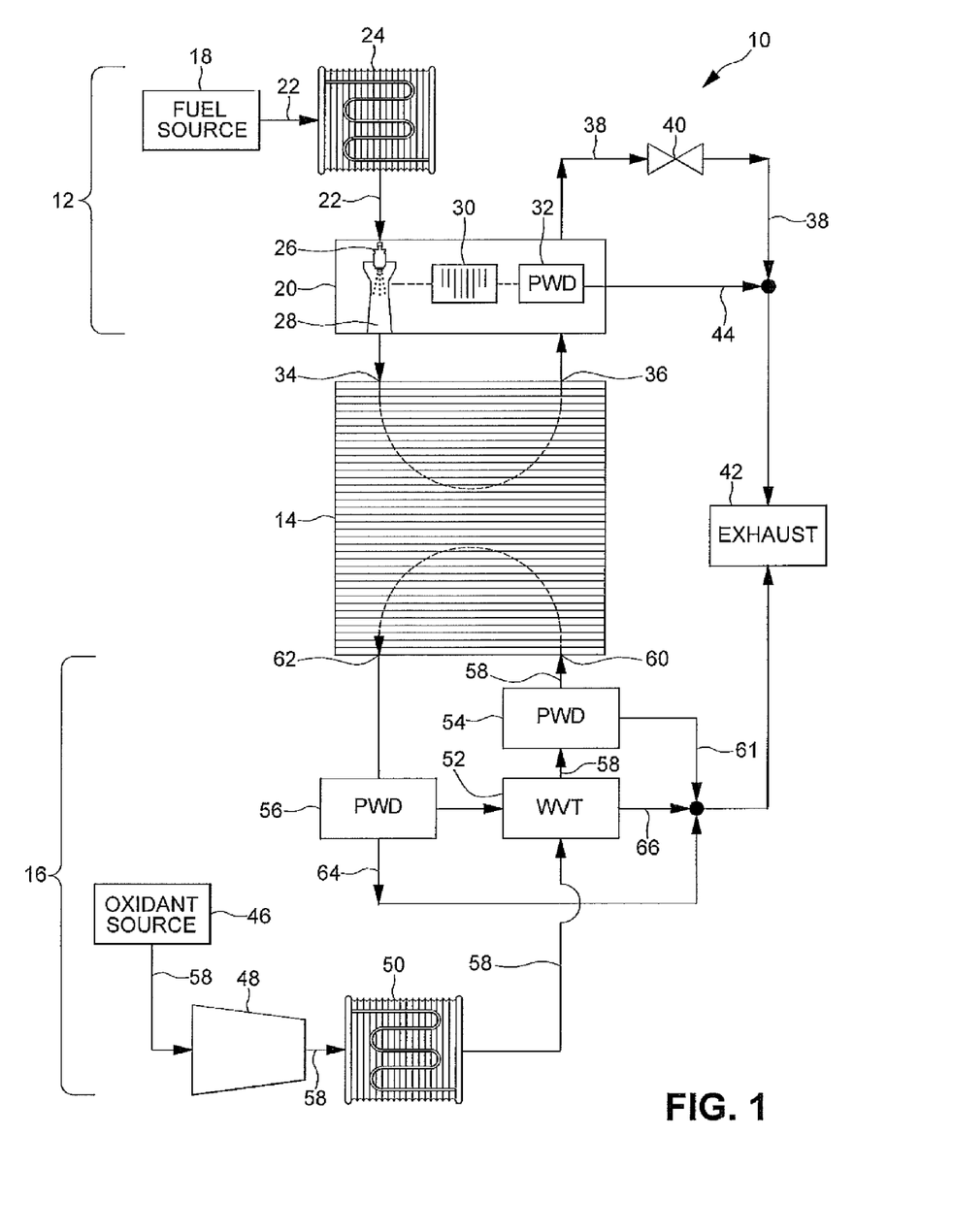
FIG. 1 illustrates a schematic flow diagram of an anode reactant recycling system, a cathode reactant system, and a fuel cell stack according to the present invention.

FIG. 1 illustrates a fuel cell system 10 according to an embodiment of the present invention. The fuel cell system 10 includes an anode reactant system 12, a fuel cell stack 14, and a cathode reactant system 16.

The anode reactant system 12 includes a fuel source 18 and an anode reactant recycler 20. The fuel source 18 is typically a storage vessel used to store a fluid such as hydrogen under pressure, but other fuel sources may be used. A fuel conduit 22 provides fluid communication between the fuel source 18 and the fuel cell stack 14. In the embodiment shown, a fuel heater 24 is disposed in the fuel conduit 22 between the fuel source 18 and the anode reactant recycler 20. The fuel heater 24 raises a temperature of the fuel entering the anode reactant recycler 20.

The anode reactant recycler 20 includes an injector 26, an ejector 28, a water separator 30, and a passive water drain 32. The anode reactant recycler 20 recycles unused fuel leaving the fuel cell stack 14, removes condensate that collects within the anode reactant recycler 20, and bleeds contaminants such as nitrogen from the anode reactant system 12. The injector 26 and the ejector 28 are in fluid communication with an anode inlet 34 of the fuel cell stack 14. An anode outlet 36 of the fuel cell stack 14 is in fluid communication with the anode reactant recycler 20. A bleed conduit 38 having a bleed valve 40 disposed therein provides fluid communication between the anode reactant recycler 20 and an exhaust 42 of the fuel cell system 10. Alternately, the bleed conduit 38 may be directed to the cathode reactant system 16 to heat the cathode during a cold start of the fuel cell stack 14. A drain conduit 44 is in fluid communication with the passive water drain 32 and the exhaust 42.

The cathode reactant system 16 includes an oxidant source 46, a compressor 48, an intercooler 50, a water vapor transfer unit (WVT) 52, a cathode inlet passive water drain 54, and a cathode outlet passive water drain 56. The oxidant source 46 is typically atmospheric air, but other oxidant sources may be used. An oxidant conduit 58 provides fluid communication between the oxidant source 46 and the fuel cell stack 14. In certain embodiments, the intercooler 50 can be eliminated from the cathode reactant system 16. The intercooler 50 raises or lowers a temperature of the oxidant before the oxidant enters one of a cathode inlet 60 of the fuel cell stack 14 and the WVT 52. The temperature of the oxidant is typically raised or lowered to a temperature of a coolant used in the fuel cell stack 14. The cathode inlet passive water drain 54 is disposed in the oxidant conduit 58 downstream from the WVT 52 to remove condensate therefrom. A drain conduit 61 is in fluid communication with the exhaust 42 for the removal of condensate from the cathode inlet passive water drain 54. The WVT 52 humidifies the oxidant before the oxidant enters the cathode inlet passive water drain 54. Exhaust fluids (such as unused oxidant and water vapor) exit the fuel cell stack 14 through a cathode outlet 62 and enter the cathode outlet passive water drain 56. After condensate is removed from the exhaust fluids with the cathode outlet passive water drain 56, the exhaust fluids enter the WVT 52. A drain conduit 64 is in fluid communication with the exhaust 42 for the removal of condensate from the cathode outlet passive water drain 56. The WVT 52 includes a vapor permeable membrane separating the oxidant conduit 58 from an exhaust conduit 66, permitting the exhaust fluids to humidify the oxidant entering the cathode inlet 60.

Figure 2:
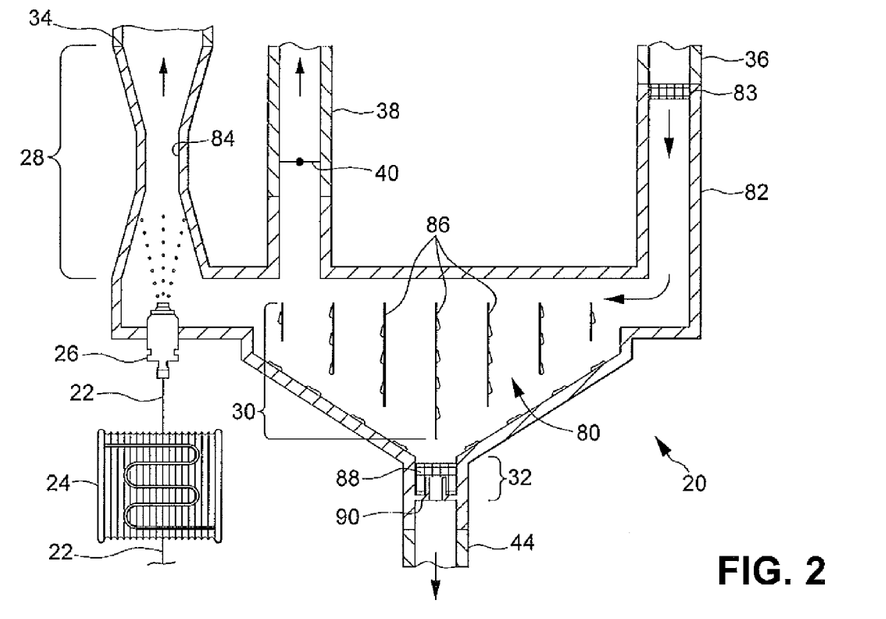
FIG. 2 illustrates a schematic flow diagram of the anode reactant recycling system illustrated in FIG. 1.

FIG. 2 illustrates the anode reactant recycler 20 according to an embodiment of the invention. The anode reactant recycler 20 shown includes the fuel heater 24. The anode reactant recycler 20 has a cavity 80 formed therein. The cavity 80 and the ejector 28 are in fluid communication with the anode inlet 34 of the fuel cell stack 14. The anode outlet 36 is in fluid communication with a recycler inlet 82. An upstream strainer 83 may be placed in the recycler inlet 82 or other serviceable upstream location to prevent particulate matter from entering the passive water drain 32. Particulate matter entering the anode reactant recycler 20 may clog the passive water drain 32, militating against removal of water from the anode reactant recycler 20. The upstream strainer 83 may be coupled to the recycler inlet 82 by any conventional means such as adhesion or a friction fit, for example. Any conventional non-corrosive material including pores formed therein such as a glass fiber mat, a sintered metal, a bonded metal mesh, a woven cloth, and a porous foam, for example, may be used to form the upstream strainer 83. The pores formed in the upstream strainer 83 are sized to remove particulate matter that may clog or impair performance of the passive water drain 32. The bleed conduit 38 and the drain conduit 44 are in fluid communication with the exhaust 42. Alternately, the bleed conduit 38 may be directed to the cathode reactant system 16 to heat the cathode during a cold start of the fuel cell stack 14. The anode reactant recycler 20 may be formed from any conventional material such as a metal, a metal alloy, a plastic, and a plastic composite, for example. The anode reactant recycler 20 may be formed separately or integrally formed with a fuel cell end unit of the fuel cell stack 14. As shown, the anode reactant recycler 20 includes the injector 26, the ejector 28, the water separator 30, and the passive water drain 32.

The injector 26 is a fuel injector as is known in the art, wherein the injector 26 provides fluid communication between the fuel source 18 and the ejector 28. The fuel from the fuel source 18 is delivered by the injector 26 to an inlet of the ejector 28.

The ejector 28 is disposed between the injector 26 and the anode inlet 34, and includes a Venturi passage 84. The Venturi passage 84 includes a neck portion having a diameter smaller than a diameter of a remaining passage portions. Any conventional material such as a metal, a metal alloy, a plastic, and a plastic composite, for example, may be used to form the ejector 28. The ejector 28 may be integrally formed as a portion of the fuel cell end unit or the anode reactant recycler 20. Any conventional means such as fastening or adhesion, for example, may be used to couple the ejector 28 to at least a portion of the anode reactant recycler 20 when the ejector 28 is formed separately. As is known in the art, combining the injector 26 and the ejector 28 in series forms a jet pump or an aspirator.

Figure 3:
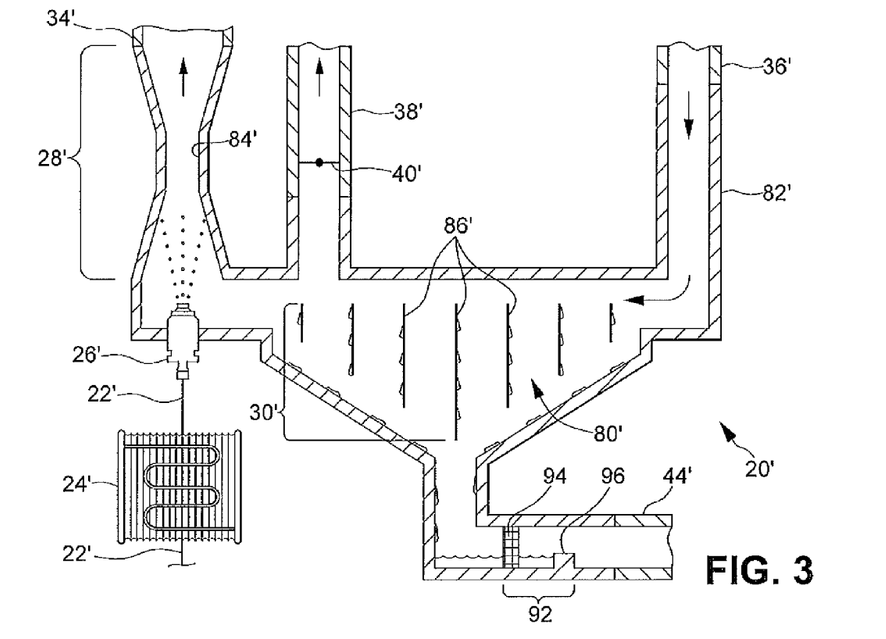
FIG. 3 illustrates a schematic flow diagram of an anode reactant recycling system according to another embodiment of the present invention.
Figure 4:
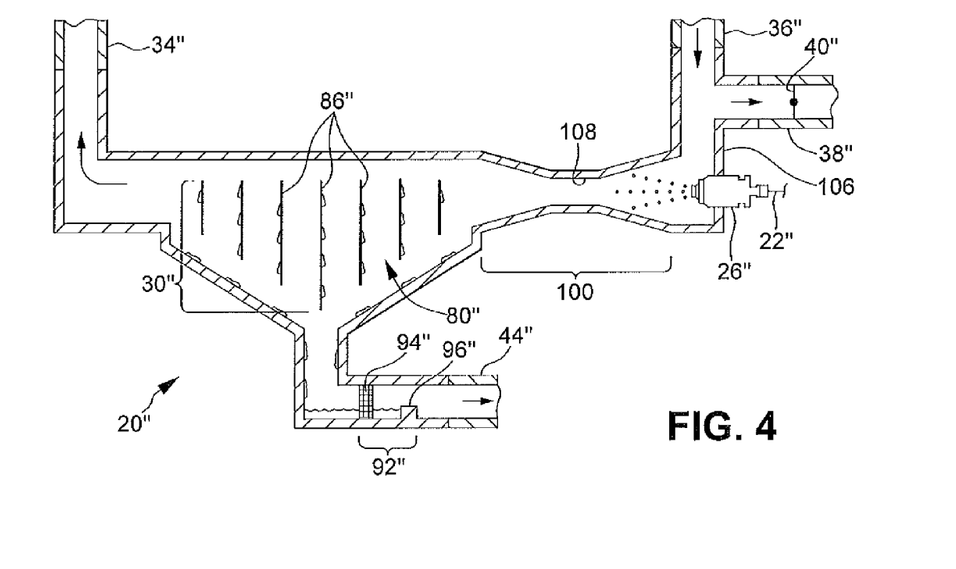
FIG. 4 illustrates a schematic flow diagram of an anode reactant recycling system according to another embodiment of the present invention.

As shown, the water separator 30 is disposed in the cavity 80 of the anode reactant recycler 20 between the recycler inlet 82 and the ejector 28. The water separator 30 may be integrally formed with the anode reactant recycler 20. Alternately, the water separator 30 may be formed separately from and coupled to the anode reactant recycler 20 by any conventional means such as fastening or adhesion, for example. Any conventional material such as a metal, a metal alloy, a plastic, and a plastic composite, for example, may be used to form the water separator 30. The water separator 30 includes a plurality of interior elements 86. As illustrated in FIGS. 2, 3, and 4, the water separator 30 includes a plurality of spaced apart and substantially parallel baffles. Other baffle arrangements, a series of chambers, a plurality of boustrophedonic passages, a cyclonic separator, or any other type of interior element may also be included with the water separator 30.

The passive water drain 32 includes a hydrophilic porous media 88 and a liquid retention feature 90. The hydrophilic porous media 88 is sealingly disposed in the drain conduit 44 of the anode reactant recycler 20. The cavity 80, the drain conduit 44, and the water separator 30 are in fluid communication with the media 88. The media 88 may be coupled to the anode reactant recycler 20 by any conventional means such as adhesion or a friction fit, for example. Any conventional non-corrosive material including pores formed therein such as a glass fiber mat, a sintered metal, a bonded metal mesh, a woven cloth, and a porous foam, for example, may be used to form the hydrophilic porous media 88. The pores formed in the hydrophilic porous media 88 are typically from about 1 micron to about 10 microns in diameter. A material forming the hydrophilic porous media 88 may be selected based on a nominal pore size and a uniformity of the pores formed therein. As shown, the hydrophilic porous media 88 is a single layer of material, but a plurality of stratified layers of material having a nominally larger pore size may be used.

The liquid retention feature 90 is disposed in the drain conduit 44 of the anode reactant recycler 20. The liquid retention feature 90 may be integrally formed with the anode reactant recycler 20. Alternatively, the liquid retention feature 90 may be formed separately and coupled to the anode reactant recycler 20 by any conventional means such as fastening or adhesion, for example. Any conventional material such as a metal, a metal alloy, a plastic, and a plastic composite, for example, may be used to form the liquid retention feature 90. The liquid retention feature 90 collects and retains a desired amount of condensate exiting the cavity 80 through the drain conduit 44. As shown in FIG. 2, the liquid retention feature 90 has a substantially "L" shaped cross-section and is shaped to substantially correspond to the drain conduit 44, but any shape may be used.

The drain conduit 44 is disposed adjacent the anode reactant recycler 20 and provides fluid communication between the cavity 80 and the exhaust 42. The drain conduit 44 may be integrally formed as a portion of the fuel cell end unit or the anode reactant recycler 20. Alternately, the drain conduit 44 may be separately formed, and may be formed from any conventional material such as a metal, a metal alloy, a plastic, and a plastic composite, for example. Any conventional means such as fastening or adhesion, for example, may be used to couple the drain conduit 44 to the anode reactant recycler 20 when the drain conduit 44 is formed separately. As shown, the drain conduit 44 is vertically oriented. However, other orientations can be used.

The bleed conduit 38 is disposed adjacent the anode reactant recycler 20 and provides fluid communication between the cavity 80 and the exhaust 42. Alternatively, the bleed conduit 38 may be directed to the cathode reactant system 16 to heat the cathode during a cold start of the fuel cell stack 14. The bleed conduit 38 may be integrally formed as a portion of the fuel cell end unit or the anode reactant recycler 20, and may be formed from any conventional material such as a metal, a metal alloy, a plastic, and a plastic composite, for example. Any conventional means such as fastening or adhesion, for example, may be used to couple the bleed conduit 38 to the anode reactant recycler 20 when the bleed conduit 38 is formed separately. As shown, the bleed conduit 38 includes the bleed valve 40 disposed therein. A controller and an actuator (not shown) in communication with the bleed valve 40 change a position of the bleed valve 40 as desired. The valve 40 may be positioned in an open position, a closed position, or an intermediate position. The bleed valve 40 may be a solenoid operated gate valve, but other valves types may be used.

FIG. 3 shows another embodiment of the invention similar to that shown in FIG. 2. Reference numerals for similar structure in respect of the description of FIG. 2 are repeated in FIG. 3 with a prime (') symbol.

The anode reactant recycler 20' shown includes the fuel heater 24'. The passive water drain 92 includes a hydrophilic porous media 94 and a liquid retention feature 96. The hydrophilic porous media 94 is sealingly disposed in the drain conduit 44' of the anode reactant recycler 20'. The cavity 80', the drain conduit 44', and the water separator 30' are in fluid communication with the media 94. The media 94 may be coupled to the anode reactant recycler 20' by any conventional means such as adhesion or a friction fit, for example. The liquid retention feature 96 is disposed in the drain conduit 44' of the anode reactant recycler 20'. The liquid retention feature 96 may be integrally formed with the anode reactant recycler 20'. Alternately, the liquid retention feature 96 may be formed separately and coupled to the anode reactant recycler 20' by any conventional means such as fastening or adhesion, for example. The liquid retention feature 96 militates against a desired amount of condensate exiting the cavity 80' through the drain conduit 44'. As shown in FIG. 3, the liquid retention feature 96' has a substantially rectangular shaped cross-section and extends across a width of the drain conduit 44', but any shape may be used.

The drain conduit 44' is disposed adjacent the anode reactant recycler 20' and provides fluid communication between the cavity 80' and the exhaust (not shown). The drain conduit 44' may be integrally formed as a portion of the fuel cell end unit or the anode reactant recycler 20'. Alternately, the drain conduit 44' may be separately formed, and may be formed from any conventional material such as a metal, a metal alloy, a plastic, and a plastic composite, for example. Any conventional means such as fastening or adhesion, for example, may be used to couple the drain conduit 44' to the anode reactant recycler 20' when the drain conduit 44' is formed separately. As shown, the drain conduit 44' is substantially horizontally oriented. However, other orientations can be used.

FIG. 4 shows another embodiment of the invention similar to that shown in FIGS. 2 and 3. Reference numerals for similar structure in respect of the description of FIGS. 2 and 3 are repeated in FIG. 4 with a double prime (") symbol.

As shown, the anode reactant recycler 20" does not include a fuel heater. The cavity 80" of the anode reactant recycler 20" is in fluid communication with the anode inlet 34" of the fuel cell stack (not shown). The anode outlet 36" is in fluid communication with an ejector 100 and the bleed conduit 38". An upstream strainer (not shown) may be placed in the anode outlet 36" or other serviceable upstream location to prevent particulate matter from entering the passive water drain 92". Particulate matter entering the anode reactant recycler 20" may clog the passive water drain 92", militating against removal of water from the anode reactant recycler 20". The bleed conduit 38" and the drain conduit 44" are in fluid communication with the exhaust (not shown). Alternately, the bleed conduit 38" may be directed to the cathode reactant system (not shown) to heat the cathode during a cold start of the fuel cell stack.

The injector 26" is a fuel injector as is known in the art, wherein the injector 26" provides fluid communication between the fuel source (not shown) and the ejector 100. The injector 26" is disposed in the anode reactant recycler adjacent a recycler inlet 106. The fuel from the fuel source is delivered by the injector 26" to an inlet of the ejector 100.

The ejector 100 is disposed between the injector 26" and the cavity 80", and includes a Venturi passage 108. The ejector 100 may be integrally formed as a portion of the fuel cell end unit or the anode reactant recycler 20". Any conventional means such as fastening or adhesion, for example, may be used to couple the ejector 100 to at least a portion of the anode reactant recycler 20" when the ejector 100 is formed separately. As is known in the art, combining the injector 26" and the ejector 100 in series forms a jet pump or an aspirator.

The bleed conduit 38" is disposed adjacent the anode outlet 36" and provides fluid communication between the anode outlet 36" and the exhaust (not shown). Alternately, the bleed conduit 38" may be directed to the cathode reactant system to heat the cathode during a cold start of the fuel cell stack. The bleed conduit 38" may be integrally formed as a portion of the fuel cell end unit or the anode reactant recycler 20", and may be formed from any conventional material such as a metal, a metal alloy, a plastic, and a plastic composite, for example. Any conventional means such as fastening or adhesion, for example, may be used to couple the bleed conduit 38" to the anode reactant recycler 20" when the bleed conduit 38" is formed separately. As shown, the bleed conduit 38" includes the bleed valve 40" disposed therein. A controller and an actuator (not shown) in communication with the bleed valve 40" change a position of the bleed valve 40" as desired. The valve 40" may be positioned in an open position, a closed position, or an intermediate position.

Figure 5:
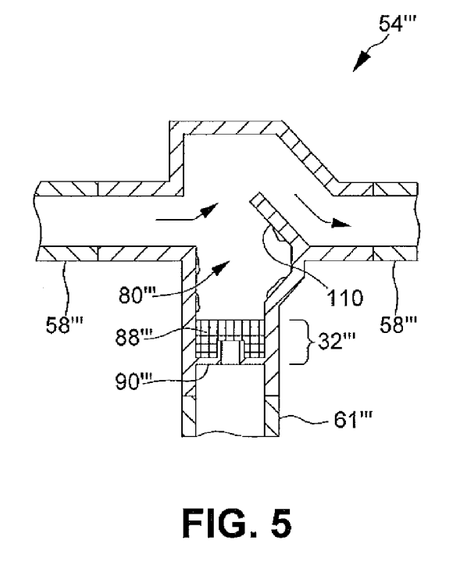
FIG. 5 illustrates a schematic side cross sectional view of a cathode inlet passive water drain for the embodiment illustrated in FIG. 1.

FIG. 5 shows another embodiment of the invention similar to that shown in FIGS. 1, 2, and 3. Reference numerals for similar structure in respect of the description of FIGS. 1, 2, and 3 are repeated in FIG. 5 with a triple prime ('") symbol.

FIG. 5 illustrates the cathode inlet passive water drain 54'". The cathode inlet passive water drain 54'" is a structure having a cavity 80'" formed therein. The cavity 80'" forms a portion of the oxidant conduit 58'". The oxidant conduit 58'" located downstream from the cavity 80'" is in fluid communication with the fuel cell stack (not shown). The oxidant conduit 58'" located upstream from the cavity 80'" is typically in fluid communication with the WVT. An upstream strainer (not shown) may be placed in the oxidant conduit 58'" or other serviceable upstream location to prevent particulate matter from entering the passive cathode inlet passive water drain 54'". Particulate matter entering the cathode inlet passive water drain 54'" may clog the passive water drain 32'", militating against removal of water from the cathode inlet passive water drain 54'". In other embodiments of the invention not shown, the oxidant conduit 58'" located upstream from the cavity 80'" may be in fluid communication with the intercooler (not shown) and the compressor (not shown). The drain conduit 61'" is in fluid communication with the exhaust (not shown). The cathode inlet passive water drain 54'" may be formed from any conventional material such as a metal, a metal alloy, a plastic, and a plastic composite, for example. The cathode inlet passive water drain 54'" may be formed separately from other components or may be integrally formed within a fuel cell end unit of the fuel cell stack. As shown, the cathode inlet passive water drain 54'" includes an interior element 110 and the passive water drain 32'".

The interior element 110 is disposed in the cavity 80'" of the cathode inlet passive water drain 54'" between an inlet and an outlet thereof. The cathode inlet passive water drain 54'" may be integrally formed with the interior element 110. Alternately, the interior element 110 may be formed separately and coupled to the cathode inlet passive water drain 54'" by any conventional means such as fastening or adhesion, for example. Any conventional material such as a metal, a metal alloy, a plastic, and a plastic composite, for example, may be used to form the interior element 110. As shown, the interior element 110 is a rectangular shaped baffle. Other shapes, a chamber, a boustrophedonic passage, a cyclonic separator, or any other type of interior element may also be included with the interior element 110.

The passive water drain 32'" includes a hydrophilic porous media 88'" and a liquid retention feature 90'". The hydrophilic porous media 88'" is sealingly disposed in the drain conduit 61'" of the cathode inlet passive water drain 54'". The cavity 80'", the drain conduit 61'", and the interior element 110 are in fluid communication with the media 88'". The media 88'" may be coupled to the cathode inlet passive water drain 54''' by any conventional means such as adhesion or a friction fit, for example.

The liquid retention feature 90''' is disposed in the drain conduit 61''' of the cathode inlet passive water drain 54'''. The liquid retention feature 90''' may be integrally formed with the cathode inlet passive water drain 54'''. Alternately, the liquid retention feature 90''' may be formed separately and coupled to the cathode inlet passive water drain 54''' by any conventional means such as fastening or adhesion, for example. The liquid retention feature 90''' collects and retains a desired amount of condensate exiting the cavity 80''' through the drain conduit 61'''. As shown in FIG. 5, the liquid retention feature 90''' has a substantially "L" shaped cross-section and is shaped to substantially correspond to the drain conduit 61''', but any shape may be used.

Figure 6:
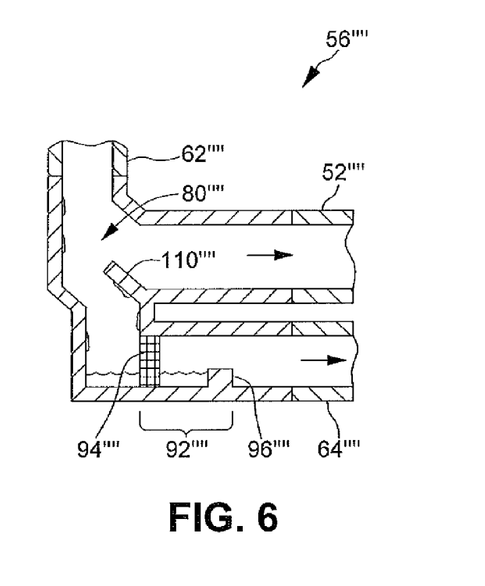
FIG. 6 illustrates a schematic side cross sectional view of a cathode outlet passive water drain for the embodiment illustrated in FIG. 1.

FIG. 6 shows another embodiment of the invention similar to that shown in FIGS. 1, 2, 3, and 5. Reference numerals for similar structure in respect of the description of FIGS. 1, 2, 3, and 5 are repeated in FIG. 6 with a quadruple prime ("") symbol.

FIG. 6 illustrates the cathode outlet passive water drain 56''''. The cathode outlet passive water drain 56'''' includes a cavity 80'''' formed therein. The cavity 80'''' forms a portion of the exhaust conduit (not shown). The exhaust conduit located downstream from the cavity 80'''' is in fluid communication with the WVT 52''''. The exhaust conduit located upstream from the cavity 80'''' is in fluid communication with the cathode outlet 62''''. An upstream strainer (not shown) may be placed in the cathode outlet 62'''' or other serviceable upstream location to prevent particulate matter from entering the cathode outlet passive water drain 56''''. Particulate matter entering the cathode outlet passive water drain 56'''' may clog the passive water drain 92'''', militating against removal of water from the cathode outlet passive water drain 56''''. The drain conduit 64'''' is in fluid communication with the exhaust (not shown). The cathode outlet passive water drain 56'''' may be formed from any conventional material such as a metal, a metal alloy, a plastic, and a plastic composite, for example. The cathode outlet passive water drain 56'''' may be formed separately from other components or may be integrally formed within a fuel cell end unit of the fuel cell stack (not shown). As shown, the cathode outlet passive water drain 56'''' includes an interior element 110'''' and the passive water drain 92''''.

The interior element 110'''' is disposed in the cavity 80'''' of the cathode outlet passive water drain 56'''' between an inlet and an outlet thereof. The cathode outlet passive water drain 56'''' may include the interior element 110'''' as integrally formed. Alternately, the interior element 110'''' may be formed separately and coupled to the cathode outlet passive water drain 56'''' by any conventional means such as fastening or adhesion, for example. Any conventional material such as a metal, a metal alloy, a plastic, and a plastic composite, for example, may be used to form the interior element 110''''. As shown, the interior element 110'''' is a rectangular shaped baffle. Other shapes, a chamber, a boustrophedonic passage, a cyclonic separator, or any other type of interior element may also be used as the interior element 110''''.

The passive water drain 92'''' includes a hydrophilic porous media 94'''' and a liquid retention feature 96''''. The hydrophilic porous media 94'''' is sealingly disposed in the drain conduit 64'''' of the cathode outlet passive water drain 56''''. The cavity 80'''', the drain conduit 64'''', and the interior element 110'''' are in fluid communication with the media 94''''. The media 94'''' may be coupled to the cathode outlet passive water drain 56'''' by any conventional means such as adhesion or a friction fit, for example. The liquid retention feature 96'''' is disposed in the drain conduit 64'''' of the cathode outlet passive water drain 56''''. The liquid retention feature 96'''' may be integrally formed with the cathode outlet passive water drain 56''''. Alternately, the liquid retention feature 96'''' may be formed separately and coupled to the cathode outlet passive water drain 56'''' by any conventional means such as fastening or adhesion, for example. The liquid retention feature 96'''' militates against a specified amount of condensate from exiting the cavity 80'''' through the drain conduit 64''''. As shown in FIG. 6, the liquid retention feature 96'''' has a substantially rectangular shaped cross-section and extends across a width of the drain conduit 64'''', but any shape may be used.

During operation of the fuel cell system 10, an anode exhaust stream is exhausted from the fuel cell stack 14 through the anode outlet 36, 36'. The anode exhaust stream contains unused fuel and byproducts such as water and nitrogen. Upon the exhaust stream entering the recycler inlet 82, 82' of the anode reactant recycler 20, 20', the exhaust stream flows across the water separator 30, 30'. As the exhaust stream flows across the water separator 30, 30', the interior elements 86, 86' or other water capture features impede the exhaust stream. A resulting increased tortuosity of the exhaust stream causes water present in the exhaust stream to collect on the interior elements 86, 86', removing the water from the exhaust stream. As the water collects on the water separator 30, 30', gravity causes the water to drain from the interior elements 86, 86' and onto an interior surface of the anode reactant recycler 20, 20'. As shown in FIG. 2, the interior surface guides the water towards the passive water drain 32, hydrating the hydrophilic porous media 88 and filling the liquid retention feature 90 with water. As shown in FIG. 3, the interior surface guides the water towards the passive water drain 92, hydrating the hydrophilic porous media 94 and filling a portion of the drain conduit 44' restrained by the liquid retention feature 96 with water.

The exhaust stream continues through the cavity 80, 80' and enters the jet pump (injector 26, 26' and ejector 28, 28'). The jet pump facilitates an intake of the exhaust stream through the use of the Venturi effect. Sufficient mixing of the fuel and the exhaust stream is thus effected through the use of the injector 26, 26' and the ejector 28, 28'. After injection of the fuel and mixing, the exhaust stream is "recycled" and has a higher fuel content and a lower water content and re-enters the fuel cell stack 14 through the anode inlet 34, 34'.

The hydrophilic porous media 88, 94 militates against a transfer of the exhaust stream through the media 88, 94 when hydrated by water. A pressure the hydrophilic porous media 88, 94 can withstand may be calculated by the bubble pressure method of surface tension. The relationship of the bubble pressure of a medium having pores of a specified diameter can be expressed as the following equation:

$$P_{bubble} = 4\sigma^* \cos(\theta)/D_{pore}$$

where, $P_{bubble}$ is a maximum pressure the hydrophilic porous media 88, 94 can withstand when hydrated; $\sigma$ is the surface tension of water; $\theta$ is the contact angle of the hydrophilic porous media 88, 94; and $D_{pore}$ is the diameter of the pores in the hydrophilic porous media 88, 94. As nonlimiting examples, the pores in the hydrophilic porous media 88, 94 having the diameter of about 2 microns yield a bubble pressure of about 116 kPa, and the pores having the diameter of about 5 microns yield a bubble pressure of about 46 kPa, where the contact angle of the hydrophilic porous media 88, 94 is about 30° and the surface tension of water is 0.067 N/m.

A thickness or the area of the hydrophilic porous media 88, 94 may be selected to militate against excessive gas transfer to the drain conduit 44, 44' in the event the hydrophilic porous media 88, 94 becomes dry. The hydrophilic porous media 88, 94 may become dry after extended periods of operation at elevated temperatures or when the oxidant has a low relative humidity. The relationship of the flow rate through a medium having a specified permeability, area, and thickness can be expressed as the following equation:

$$Q_{trans} = kA\Delta P/\mu L$$

Where, $Q_{trans}$ is the volume flow rate through the hydrophilic porous media 88, 94; k is the permeability (a function of the pore size and the material tortuosity) of the hydrophilic porous media 88, 94; A is the area of the hydrophilic porous media 88, 94; $\Delta P$ is the differential pressure across the hydrophilic porous media 88, 94; $\mu$ is the viscosity of the fluid passing through the hydrophilic porous media 88, 94; and L is the thickness of the hydrophilic porous media 88, 94. Accordingly, the thickness of the hydrophilic porous media 88, 94 may be increased or the area of the hydrophilic porous media 88, 94 exposed to the cavity 80, 80' may be decreased to reduce gas transfer through the hydrophilic porous media 88, 94 when dry without affecting the bubble pressure of the hydrophilic porous media 88, 94.

A saturation point for the hydrophilic porous media 88, 94 is the condition where the hydrophilic porous media 88, 94 has absorbed the greatest amount of water it can hold. The water in excess of the media 88, 94 saturation point is restrained by the liquid retention feature 90, 96 until the water overflows the liquid retention feature 90, 96 and exits the anode reactant recycler 20, 20' through the drain conduit 44, 44'.

After periods of non-operation of the fuel cell system 10, nitrogen or other gases diffuse into the anode reactant system 12 and may be purged therefrom to facilitate starting of the fuel cell system 10. During purging, the bleed valve 40, 40' is opened, allowing the exhaust stream to be exhausted through the bleed conduit 38, 38' by operating the injector 26, 26', removing the nitrogen or other gases present in the anode reactant system 12. Further, the anode reactant system 12 may be purged intermittently during operation of the fuel cell system 10 to remove byproducts that may inhibit performance of the fuel cell system 10. The exhaust stream having a higher fuel content (due to fuel injection) and a lower water content (after flowing across the water separator 30, 30') may re-enter the fuel cell stack 14 through the anode inlet 34, 34'.

As shown in FIG. 4, an anode exhaust stream is exhausted from the fuel cell stack (not shown) through the anode outlet 36". The anode exhaust stream contains unused fuel and byproducts such as water and nitrogen. The exhaust stream enters the recycler inlet 106 of the anode reactant recycler 20", and continues to the jet pump (injector 26" and ejector 100). The jet pump facilitates an intake of the exhaust stream through the use of the Venturi effect. Sufficient mixing of the fuel and the exhaust stream is thus effected through the use of the injector 26" and the ejector 100. The fuel (being unheated) causes water vapor present in the exhaust stream to condense. The exhaust stream then flows across the water separator 30", removing the water therefrom. The water is then removed from the anode reactant recycler 20" through the passive water drain 92". The exhaust stream having a higher fuel content (due to fuel injection) and a lower water content (after flowing across the water separator 30") re-enters the fuel cell stack through the anode inlet 34".

A cathode inlet stream enters the fuel cell stack 14 through the cathode inlet 60. When the oxidant source 46 is atmospheric air, the cathode inlet stream contains water vapor. Further humidification of the cathode inlet stream occurs when the cathode inlet stream passes through the WVT 52. During cold starts, water vapor present in the cathode inlet stream passing through the compressor 48, the intercooler 50, and the WVT 52 is likely to condense into water. As shown in FIG. 5, the cathode inlet stream including water then enters the cavity 80"' of the cathode inlet passive water drain 54"'. As the cathode inlet stream flows across the interior element 110, the cathode inlet stream is impeded. A resulting increased tortuosity of the cathode inlet stream causes water present in the cathode inlet stream to collect on the interior element 110, removing the water from the cathode inlet stream. As the water collects on the interior element 110 and the interior surface of the cathode inlet passive water drain 54"', gravity causes the water to drain from the interior element 110 and the interior surface and onto the hydrophilic porous media 88"'. The interior surface guides the water towards the passive water drain 32"', hydrating the hydrophilic porous media 88"' and filling the liquid retention feature 90"' with water. Water in excess of the saturation point of the hydrophilic porous media 88"' exits the cathode inlet passive water drain 54"' through the drain conduit 61"'. The cathode inlet stream having a reduced amount of water continues through the cavity 80"' and exits the cathode inlet passive water drain 54"', continuing through the oxidant conduit 58"' to the fuel cell stack 14.

During operation of the fuel cell system 10, a cathode outlet stream exits the fuel cell stack 14 through the cathode outlet 62, 62"". Water generated within the fuel cell stack 14 is exhausted through the cathode outlet 62, 62"" in the cathode outlet stream. As shown in FIG. 6, the cathode outlet stream including water then enters the cavity 80"" of the cathode outlet passive water drain 56"". As the cathode outlet stream flows across the interior element 110"", the cathode outlet stream is impeded. A resulting increased tortuosity of the cathode outlet stream causes water present in the cathode outlet stream to collect on the interior element 110"", removing the water from the cathode outlet stream. As the water collects on the interior element 110"" and the interior surface of the cathode outlet passive water drain 56"", gravity causes the water to drain from the interior element 110"". The interior surface guides the water towards the passive water drain 92"", hydrating the hydrophilic porous media 94"". Water in excess of the saturation point of the hydrophilic porous media 94"" is retained by the liquid retention feature 96"". Water in excess of the amount the liquid retention feature 96"" can retain exits the cathode reactant system 16 through the drain conduit 64, 64"". The cathode outlet stream having a reduced amount of water continues through the cavity 80"" and exits the cathode outlet passive water drain 56"', continuing to the WVT 52, 52"".

It should be appreciated that the passive water drain 32, 32"', 92, 92", 92"" eliminates the need for valves located in the drain conduit 44, 44', 44", 61"', 64"". Further, it should be appreciated that the passive water drain 92"" eliminates the need for bulky and costly valve systems that direct the cathode outlet stream to bypass the WVT 52"". The passive water drain 32"' also eliminates the need for condensate draining systems used to remove water from compressed air in the cathode inlet stream. The passive water drain 32, 32"', 92, 92", 92"" in accord with the present invention simplifies water removal from the anode reactant system 12, the fuel cell stack 14, and the cathode reactant system 16 by requiring fewer components.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A device for receiving a fluid stream comprising:
a main body having a cavity formed therein, the main body including an inlet, an outlet, a passive water drain, and a drain conduit coupled to the passive water drain, wherein the inlet is adapted to receive the fluid stream and the drain conduit does not include a valve;
an interior element disposed in the cavity of the main body adapted to increase a tortuosity of the fluid stream; and
a hydrophilic porous media disposed within the passive water drain in fluid communication with the cavity, the hydrophilic porous media configured to militate against transfer of the fluid stream through the passive water drain and to allow liquid water to pass through the passive water drain, wherein the fluid stream is exhausted from the cavity through the outlet.

2. The device for receiving a fluid stream according to claim 1, wherein the fluid stream includes a liquid, the liquid collecting in the cavity thereby hydrating the hydrophilic porous media, the liquid in excess of a saturation point of the hydrophilic porous media exiting the cavity through the passive water drain.

3. The device for receiving a fluid stream according to claim 1, wherein one of a thickness and an area of the hydrophilic porous media is selected to militate against transfer of the fluid stream through the passive water drain.

4. The device for receiving a fluid stream according to claim 1, wherein the hydrophilic porous media is sealingly disposed in the passive water drain.

5. The device for receiving a fluid stream according to claim 1, wherein the hydrophilic porous media has a pore size from about 1 to about 10 microns.

6. The device for receiving a fluid stream according to claim 1, wherein the hydrophilic porous media is one of a glass fiber mat, a sintered metal, a bonded metal mesh, a woven cloth, and a porous foam.

7. The device for receiving a fluid stream according to claim 1, further comprising a strainer disposed in the inlet of the main body.

8. The device for receiving a fluid stream according to claim 1, further comprising a liquid retention feature disposed adjacent the hydrophilic porous media.

9. The device for receiving a fluid stream according to claim 1, wherein the cavity of the main body is adapted to be in fluid communication with an anode outlet of a fuel cell system.

10. The device for receiving a fluid stream according to claim 9, further comprising a water vapor transfer unit in fluid communication with the cavity of the main body.

11. The device for receiving a fluid stream according to claim 10, wherein the cavity of the main body is adapted to be in fluid communication with one of a cathode inlet and a cathode outlet of a fuel cell system.

12. The device for receiving a fluid stream according to claim 1, further comprising an intercooler in fluid communication with one of the inlet and the outlet of the main body.

13. A device for receiving a fluid stream in a fuel cell system comprising:
a main body having a cavity formed therein, the main body including an inlet, an outlet, a passive water drain, and a drain conduit coupled to the passive water drain, wherein the inlet is adapted to receive the fluid stream and the drain conduit does not include a valve;
an interior element disposed in the cavity of the main body adapted to increase a tortuosity of the fluid stream;
a hydrophilic porous media sealingly disposed in the passive water drain in fluid communication with the cavity; and
a liquid retention feature disposed adjacent the hydrophilic porous media, wherein the hydrophilic porous media is configured to militate against transfer of the fluid stream through the passive water drain and and to allow liquid water to pass through the passive water drain, wherein the fluid stream is exhausted from the cavity through the outlet.

14. The device for receiving a fluid stream in a fuel cell system according to claim 13, wherein the fluid stream includes a liquid, the liquid collecting in the cavity thereby hydrating the hydrophilic porous media, the liquid in excess of a saturation point of the hydrophilic porous media exiting the cavity through the passive water drain.

15. The device for receiving a fluid stream in a fuel cell system according to claim 13, wherein one of a thickness and an area of the hydrophilic porous media is selected to militate against transfer of the fluid stream through the passive water drain.

16. The device for receiving a fluid stream in a fuel cell system according to claim 13, wherein the hydrophilic porous media has a pore size from about 1 to about 10 microns.

17. The device for receiving a fluid stream in a fuel cell system according to claim 13, wherein the hydrophilic porous media is one of a glass fiber mat, a sintered metal, a bonded metal mesh, a woven cloth, and a porous foam.

18. The device for receiving a fluid stream in a fuel cell system according to claim 13, wherein the cavity of the main body is adapted to be in fluid communication with at least one of an anode, a cathode, and a water vapor transfer unit of a fuel cell system.

19. The device for receiving a fluid stream in a fuel cell system according to claim 13, further comprising a strainer disposed in the inlet of the main body.

* * * * *